Dec. 9, 1941.   W. CHRISTIANSEN   2,265,629
COIL SPRING CONNECTOR
Filed Nov. 2, 1939
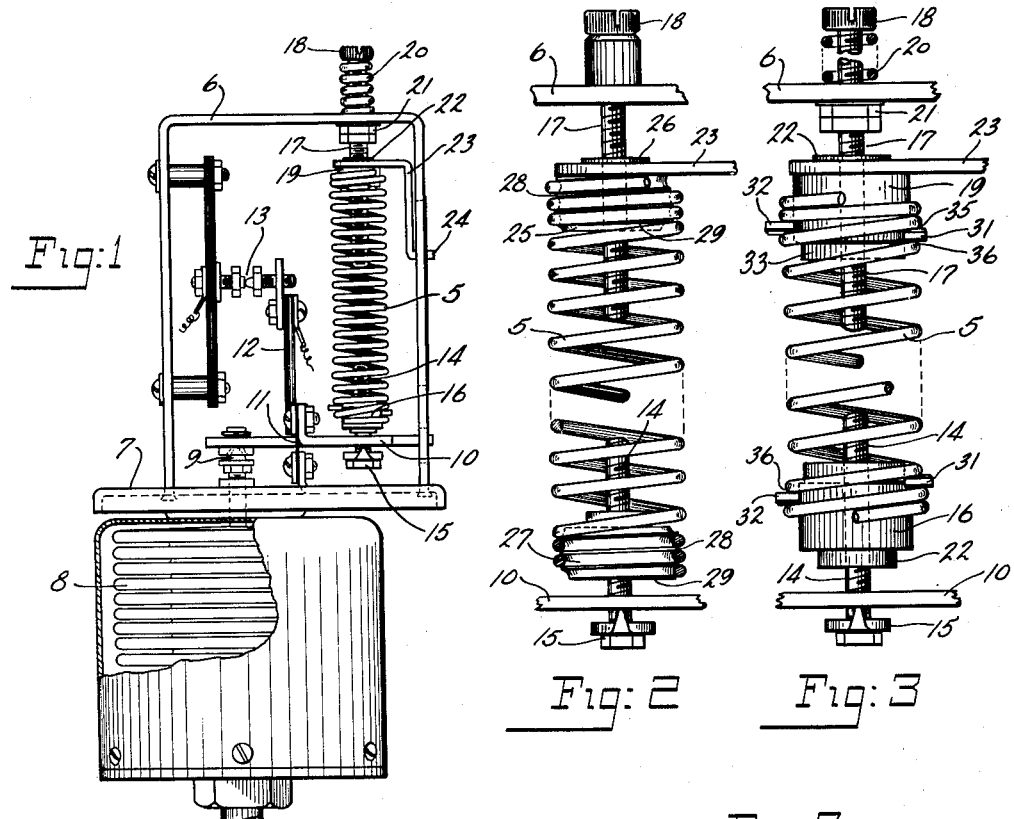
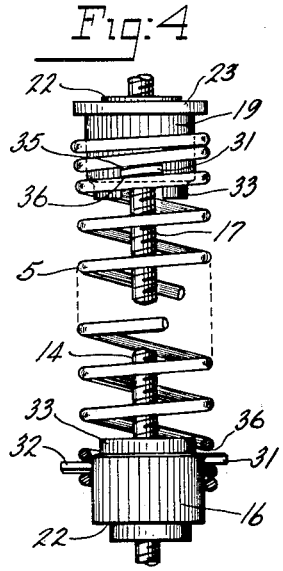
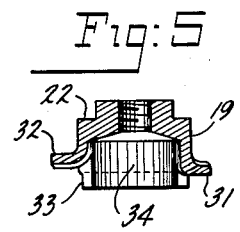
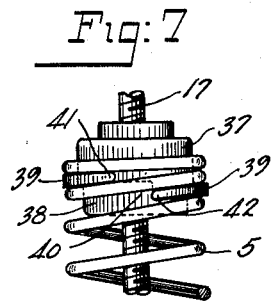
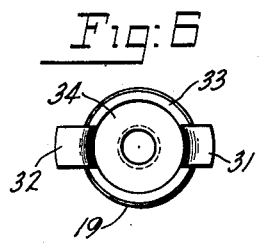
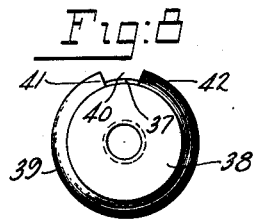
INVENTOR.
William Christiansen
BY
ATTORNEY.

Patented Dec. 9, 1941

2,265,629

UNITED STATES PATENT OFFICE 2,265,629

COIL SPRING CONNECTOR

William Christiansen, Milwaukee, Wis., assignor to Perfex Corporation, Milwaukee, Wis., a corporation of Wisconsin Application November 2, 1939, Serial No. 302,494

3 Claims. (Cl. 267—1)

This invention relates in general to connecting means for coil springs and the like, and the general object is to provide an improved coil spring connector which is economical to manufacture, easy to install, and which firmly supports one end of a coil spring in gripping relationship.

Coil springs have universal application when employed in connection with various devices and apparatus where it is necessary that the value of a condition at which the device operates, be readily adjustable within certain limits. For example, coil springs, either under tension or compression, are extensively utilized for adjusting and calibrating weighing scales; pressure valves and other valves for controlling the flow of fluids; electrical control devices, particularly air conditioning devices responsive to temperature, pressure, or other physical conditions; and many other uses.

In practice the coil springs are usually supported in such a manner in the particular device that they are readily adjusted with respect to their tension so that the device is enabled to establish its control function at any particular value desired. The coil spring is also usually effective to restore the device to a particular position after having been operated in response to the physical condition to which it responds. The coil supporting means usually consists of a connecting means arranged on each end of the coil spring which engages several end turns to support the spring under any adjustable desired tension.

In adjusting the spring to various degrees of tension, a screw or other adjusting means usually engages the spring connector and is adapted to shift the connector to exert more or less force upon the coil spring. In instances where the spring is adjusted, for example at a very high tension, so as to exert considerable force, several of the coils or turns of the spring may snap off the connector when the device which the spring controls is actuated. Upon restoration of the device to normal, the spring contracts and the few turns forced off the connector may not again engage the connector. If this occurs, it will be obvious that the device is thrown out of adjustment and it will not accurately respond at the value to which it has been adjusted.

It is an object of the invention therefore, to provide an improved connector in which it is impossible for the coil spring turns or convolutions to become displaced from the connector and in which the adjustment of the coil spring is maintained constant and accurate under varying degrees of tension.

A further object of the invention is to provide a spring connector in which it is difficult to change the association of the coil spring with the connector, thereby preventing the changing or alteration of the spring calibration in the field after having once been set in the factory.

A further object of the invention is to provide a spring connector in combination with a coil spring in which the breaking point of the spring from the connector always takes place at the same point on the connector.

A further object is to provide a novel means for frictionally resisting the adjustment of the adjusting means to prevent the inadvertent alteration of the same when subjected to excessive vibration, shock or jars.

Other objects and features not specifically enumerated reside in the novel construction, arrangement and combination of the various elements and parts which will hereinafter be more fully described and particularly pointed out in the description and appended claims in connection with preferred embodiment of the invention, reference being had to the accompanying drawing forming a part thereof and in which:

Figure 1 discloses a side elevation of an air conditioning or control device incorporating the invention;

Figure 2 illustrates a coil spring and associated connector element of the conventional type as heretofore utilized;

Figure 3 discloses a coil spring and associated connector made according to the invention;

Figure 4 is a view similar to Figure 3 but shown from another angle;

Figure 5 is a cross sectional side view of the novel spring connector;

Figure 6 is an end view thereof;

Figure 7 is a view of a modified form of the spring connector; while

Figure 8 is an end view of the modified form shown in Figure 7.

The invention has been illustrated for example for use in connection with a device such as an air conditioning control device, although, as pointed out, the invention is applicable to many other uses. Referring particularly to Figure 1, an adjustable coil spring 5, as shown, is usually provided in the control device for adjusting the control point at which the device is to function and also for restoring it to its normal position after having been actuated. In the example disclosed, the control device comprises essentially a U-shaped metal frame 6 supported in any manner on a metal base 7. The means for operating the device may take the form of a bellows 8 for example, which may be connected to a motive power source which will exert either pressure or a vacuum upon the bellows. The bellows may also be connected to a steam or hot water boiler, or to an air pressure source for controlling the same. The actuating end of the bellows is provided with a pivot point 9 which is arranged to exert the force of the bellows 8 upon a lever 10 pivotally secured by a spring hinge 11 to the base 7. An insulated arm 12 secured to the lever 10 carries a contact point whereby the movement of arm 12 is effective to open and close a pair of contacts 13 to control any desired electric circuit.

An adjusting or calibrating screw 14 is arranged at one end of spring 5 and is provided with a pivoting head portion 15 engaging the under side of the lever 10. Screw 14 threads through a spring connector or coupling 16 for fastening the lower end of the coil spring 5 in adjustable relation with screw 14.

At the upper end of spring 5 a second adjusting screw 17 is provided having a head 18 arranged so as to be readily accessible for adjustment of the spring 5. The adjusting screw 17 threads into a second spring connector 19 for supporting the upper end of the spring 5. A coil tension spring 20 surrounds the portion of the adjusting screw 17 between its head 18 and the top of the bracket 6 so as to exert a certain amount of tension on the screw 18 to prevent inadvertent or undesired displacement of the screw 17 by presenting a certain amount of frictional resistance to its turning adjustment. The constant and stable adjustment of the spring 5 is thereby assured at all times. A pair of lock nuts 21 are threaded on the screw 17 below the bracket 6 so that any desired tension upon the spring 20 may be provided.

The upper spring connector 19 is provided with a shoulder portion 22 for rigidly fastening, as by riveting, an indicator arm 23 thereto. The indicator arm 23 is provided with a pointer 24 extending through a slot in the bracket 6 so that the correct adjustment or setting of the coil spring 5 may be visibly indicated on a scale plate (not shown) conveniently positioned on the bracket 6 in cooperative relation with the pointer 24.

The foregoing arrangement disclosed in Fig. 1 is a conventional form of control device to which the invention has been applied. As has been indicated previously, these control devices were provided with spring connectors usually of the type disclosed in Fig. 2 which presented numerous disadvantages and difficulties tending to maintain the spring adjustment unstable, unreliable and difficult to maintain constant so that at times the control device would operate in an unsatisfactory manner.

In the previous type of spring connectors, as disclosed in Fig. 2, a connector 25 was provided which had a spiral screw thread formed thereon conforming generally to the shape of the coil spring 5. Several convolutions of the coil spring 5 were threaded upon these screw threads in the conventional manner as shown. A shoulder portion 26 formed on the connector 25 served the purpose of attaching the indicator arm 23. A second spring connector 27 was associated with the lower or other end of the coil spring 5. The coil spring, when threaded upon the screw threads of connectors 25 and 27, was arranged so that a slight projection 28 between the threads extended between the turns or convolutions of the coil spring and served to separate them slightly. In forming the connectors 25 and 27 with the screw threads thereon, it naturally followed that a gradually tapering, thin, feather edge such as indicated at 29 was formed at the beginning and end of the screw thread. In actual practice, when the coil spring 5 was subjected to considerable tension by the adjustment of screw 17, the last turn of the coil spring 5 would engage or disengage the thin edge 29 at various points along the thread depending upon how thin the edge 29 was at any particular point. In the operation of the control device this variable positioning of the end coil upon the screw thread would in time throw the adjustment of the control device out of its correct setting so that it was never certain that the contact 13, for example, would open and close always at the particular setting called for. Each time the control device was actuated and the coil spring 5 stretched, it would slip off a portion of the thin edge 29 and, upon restoration of the control device and resultant contraction of the spring, the end coil would engage the outside of the thin edge and might not snap in position on the screw thread.

In addition, since the end coil spring turn exerted a sidewise thrust upon the connector 25, a further difficulty is incurred in performing accurate adjustments. Furthermore, should it occur that the adjusting screw 18 be turned to such a position that the coil spring 5 is placed under considerable tension and the pointer 24 moved to the upper limit of the scale adjustment, several of the coil turns may slip or snap over the ends of the screw threads of the connector, thereby throwing the spring out of adjustment, since the coils would not snap back into position when the spring is restored. Another difficulty also arose when the coil spring 5 was under considerable tension, the end coils of the spring 5 might slide laterally around the screw threads for some distance until the coil spring is disengaged or almost disengaged from the connectors. From the foregoing explanation in connection with Fig. 2, it will be seen that the construction of the prior types of spring connectors presented numerous disadvantages tending to make the constant and reliable adjustment and calibration of a coil spring very difficult to maintain. These disadvantages have been substantially eliminated and materially reduced by the structure of the invention.

Figs. 3, 4, 5 and 6 particularly illustrate the preferred embodiment of the invention. The spring connector 16 arranged at the lower end of the coil spring 5, and spring connector 19 arranged at the upper end, are identical in form and preferably constructed and shaped cylindrically as illustrated specifically in Figs. 5 and 6. Lug means comprising a plurality but preferably a pair of projecting ears or lugs 31 and 32 are arranged or struck out laterally from opposite sides of the body portion 19 as by a punching operation. As shown in Fig. 5, the lug 31 is arranged at a different or lower elevation on the body than the lug 32. The purpose of this arrangement is to enable the lugs to be arranged in spiral formation around the body portion 19 in conformity with the general shape of the coil spring convolutions. The lugs 31 and 32, it will be noted, are themselves formed with their surfaces having an inclination formed in the direction generally of the coil spring turns. Since the lugs 31 and 32 are arranged at different elevations and punched from the body portion, the lug 31 will naturally extend laterally a somewhat shorter distance from the body 19. The lower portion of the connector body 19 is provided with a slightly narrower skirt portion 33 for a purpose which will be pointed out hereinafter. At the other end of the body the connector 19 is provided with a shoulder portion 22 for the purpose of attachment of the indicator arm 23. An axial opening 34 extends for a substantial distance within the body portion 19 and enables the lugs 31 and 32 to be struck from the walls of the cylindrical body. The screw threaded opening through the opposite end of the body 19 is provided for admission of the adjusting screws 14 or 17. While both spring connectors 16 and 19 are constructed identically in form, only the shoulder 22 of the upper one 19 is utilized for the purpose of attaching the indicator arm 23.

In the assembly and association of the coil spring 5 with its connectors 16 and 19 the initial operations required are those in which the "spring rate" of the coil spring is calibrated. This spring rate may be defined as the amount or rate of effort applied to the spring to cause it to move or deflect a predetermined amount. The spring rate is calibrated or determined by threading a greater or lesser number of coil convolutions upon the connectors through the lugs 31 and 32, thereby stretching the spring initially to the desired calibration. This calibration when once established in the factory cannot be conveniently altered in the field and the initial calibration of the spring rate of the coil spring is thereby assured at all times.

After the coil spring rate has been calibrated, it is necessary that the action of the switching mechanism, including the lever 10, arm 12 and the contacts 13, be correlated or calibrated with respect to the scale markings (not shown) stamped upon the front of the frame 6, which markings cooperate with the indicator 24 to determine the point at which the control device is set to operate. This adjustment is accomplished by setting the indicator 24 opposite a particular scale figure by means of adjusting screw 18, applying a force to the bellows 8, corresponding to the scale setting and then adjusting the screw 14 until the contacts 13 just open. Subsequently, wherever it is desired to alter the value at which the contacts 13 are opened, it is merely necessary to turn the screw head 18 and thereby move the pointer 24 to the desired scale indication. From the foregoing, it is seen that the lower connector 16 serves to calibrate the device while the upper connector 19 is utilized to perform the control adjustment point of the same.

The small relatively stiff spring 20 encircling the adjusting screw 17 exerts frictional force between the frame 6 and the head 18 so that the adjustment of screw 17 will be maintained and assured during repeated or continuous operation of the device or under severe vibrational conditions. The lock nuts 21 may be shifted on the screw 17 to vary the frictional resistance of the spring 20 if necessary.

Referring particularly to Figs. 3 and 4, it will be noted that approximately one and one-half turns or convolutions of the coil spring 5 have been placed upon the body portion of connectors 16 and 19 and threaded between the lugs 31 and 32. This number of turns is generally sufficient to establish the calibration of the spring rate of the spring 5. The one and one-half turns upon the body of the connectors have been expanded slightly due to the fact that the diameter of the body of the connectors is slightly larger than the internal diameter of the coil spring 5. This slight expansion of the end turns of the coil spring enables the turns or convolutions to more firmly grip the body of the connectors due to their tension. As shown in Fig. 3, the upper connector 19 has its lugs 31 and 32 positioned between a single pair of turns or convolutions of the coil spring, that is, one convolution is in engagement with the top of lug 31, as indicated at 35, while another is in engagement with the bottom as indicated at 36. The lugs therefore are securely gripped between different adjacent convolutions of the coil spring. The tension between the turns wound upon the connectors is ordinarily greater than the tension of the free turns of the coil spring 5, between the ends of both connectors. Therefore the lugs 31 and 32 are firmly gripped by the associated convolutions, and the connected ends of the coil spring are maintained securely upon the connectors during repeated expansion and contraction of the coil spring under varying degrees of adjustment and operations. When the control device is operated under conditions in which the coil spring is tensioned to a very high value, the last convolution of the coil spring engaging the lugs, as indicated at 36, may slightly leave the bottom of the lug. However, sufficient gripping action is present to prevent the end turns of the coil from separating from the connector. The guiding skirt portion 33 projecting from the lugs to one end of each connector body is of a smaller diameter than the body portion and also smaller than the internal diameter of the spring, so that the spring coils do not bind at this portion of the connector. This skirt portion extends loosely into the spring body and assists in guiding the coils back into position against the under side of the lugs 31 and 32, when the spring is contracted.

Each time that an expansion movement of the coil spring 5 takes place, the section of a turn or convolution extending between the lugs 31 and 32 is subjected to a slight bending or "breaking" action which occurs at the point indicated at 35 upon the edge of the upper portion of the lug 31 or 32. This breaking point is the point at which the coil spring leaves the lower portion of the connector 19 and is that point from which the spring during all its stretching operations, pivots from the end of the connector. This breaking point, it will be observed, always occurs at the same place upon the coil spring turn and therefore the calibration and adjustment of the spring is maintained constant under varying conditions of operation and adjustment. Furthermore this breaking point will never vary or shift its position either upon the upper connector 19 or the lower connector 16.

Each time that the spring is adjusted to a high tension value and then allowed to contract after a control operation, the coils restore to the same position, and it is seen that due to the length of the lugs 31 and 32, the spring bears on what may be termed flat surfaces of each of the lugs 31 and 32, and it is impossible for the turns to snap off or become displaced from the lugs. Due to the fact that several turns of the coil spring 5 are arranged on the body 19 beyond the lugs 31 and 32, a tilting action between the spring 5 and the connector 19 is avoided, so that the connector 19 is not pulled to an inclined position by the tension of the spring but remains axially in alignment or parallel therewith. This further tends to maintain the adjustment of the coil spring at a constant value.

A modified form of the connector is disclosed in Figs. 7 and 8. In this form of the invention the connector 37 is preferably die cast and consists of a cylindrical body having a lower portion 38 of slightly smaller diameter corresponding to the skirt portion 33 of Fig. 5. Instead of the lugs 31 and 32 a single spiral shaped turn or lug 39 is formed on the body 37. The spiral turn 39 does not completely encircle the body 37 but the abrupt end portions thereof, 41 and 42, are separated by the space indicated at 40. The function of the connector 37 in this modification is the same as the connectors previously described, in that the body 37 is slightly larger than the internal diameter of the spring 5 so that the spring is slightly expanded on the body. This single lug 39 extends almost all the way around the body between a single pair of spring convolutions. Also the "breaking" point of the spring 5 takes place at the upper portion of the abrupt end 42 which corresponds to the point 35 on lug 31 of Fig. 4. The skirt portion 38 serves to guide the spring to its contracted position. In this form of the invention, due to the larger engaging surfaces of turn 39, a somewhat more substantial gripping action is applied to the turns or convolutions associated with the connector body 37.

From the foregoing it is seen that a novel spring connector has been devised in which numerous advantages are presented over previous types of connectors tending to maintain the adjustments of coil springs in a more stable and reliable manner. While only two specific embodiments of the invention have been illustrated and described, it is to be understood that various modifications thereof will be apparent to those well versed in the art without departing from the spirit and scope of the invention set forth in the appended claims.

What is claimed is:

1. In a calibrated instrument, the combination of, a movable member, a coil spring adapted to be stressed in tension for biasing said movable member in one direction, and means for independently adjusting the tension and spring rate of said coil spring, said last mentioned means comprising a spring connector associated with one end of said coil spring, said spring connector comprising a generally cylindrical member having a screw threaded opening extending axially thereof, an adjusting screw extending into said opening, said cylindrical member having a first end portion thereof of a diameter slightly greater than the normal inner diameter of said spring and a second end portion of reduced diameter which is smaller than the normal inner diameter of said spring, and lug means located around the periphery of said first end portion, said lug means being located in a spiral about said first end portion conforming generally to the pitch of said spring and terminating at the juncture of said end portions to provide a fixed break point for the spring beyond which it may expand or contract in an endwise direction free of contact with said second end portion.

2. In a calibrated instrument, the combination of, a movable member, a coil spring adapted to be stressed in tension for biasing said movable member in one direction, and connector means for one end of said spring adapted to permit adjustment of the spring rate thereof, said connector means comprising a generally cylindrical member adapted internally for connection to a tension member, said cylindrical member having a first end portion thereof of a diameter slightly greater than the normal inner diameter of said spring and a second end portion of a reduced diameter which is smaller than the normal inner diameter of said spring, and lug means located around the periphery of said first end portion, said lug means being located in a spiral about said first end portion conforming generally to the pitch of said spring and terminating at the juncture of said end portions to provide a fixed break point for the spring beyond which it may expand or contract in an endwise direction free of contact with said second end portion.

3. In a calibrated instrument, the combination of, a movable member, a coil spring adapted to be stressed in tension for biasing said movable member in one direction, and connector means for one end of said spring adapted to permit adjustment of the spring rate thereof, said connector means comprising a cup-like member having a generally cylindrical side wall and a bottom wall, said bottom wall being formed for connection with a tension member, said side wall having lugs struck out therefrom at circumferentially spaced points and bent so as to project substantially perpendicularly of the side wall and in a spiral relationship to each other, a first portion of said side wall between said lugs and bottom wall having an outer diameter substantially greater than the normal inner diameter of said spring, and a second portion of said side wall between one of said lugs and the open end of said member having an outer diameter less than the normal inner diameter of said spring, one of said lugs being located at the juncture between the first and second portions to provide a definite break point beyond which the spring may expand and contract in an endwise direction free of contact with said second portion.

WILLIAM CHRISTIANSEN.